No. 772,399. PATENTED OCT. 18, 1904.
G. W. BOWEN.
LUBRICATOR.
APPLICATION FILED AUG. 20, 1903.
NO MODEL.

Witnesses
Ralph A. Shepard
H. J. Shepard

Inventor
George W. Bowen
by C. C. Shepherd
Attorney

No. 772,399. Patented October 18, 1904.

UNITED STATES PATENT OFFICE.

GEORGE W. BOWEN, OF AUBURN, NEW YORK.

LUBRICATOR.

SPECIFICATION forming part of Letters Patent No. 772,399, dated October 18, 1904.

Application filed August 20, 1903. Serial No. 170,171. (No model.)

*To all whom it may concern:*

Be it known that I, GEORGE W. BOWEN, a citizen of the United States, residing at Auburn, in the county of Cayuga and State of New York, have invented certain new and useful Improvements in Lubricators, of which the following is a specification.

This invention relates to lubricators, and has for its object to provide certain new and useful improvements in what are termed "grease-cups," wherein pressure is applied upon the grease or other lubricant to insure a proper feed thereof. It is furthermore designed to obviate accidental loosening and displacement of the member which is adapted to press upon the lubricant and in this particular to adapt the device for application to motor-vehicles and in other places where there is violent jarring and great vibration.

In connection with the feature of preventing loosening of the pressure member it is also an important object of the invention to provide for facilitating the adjustment of the pressure member.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

Figure 1:
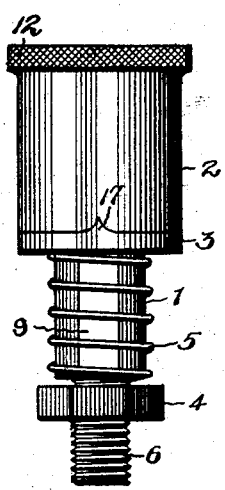
Figure 5:
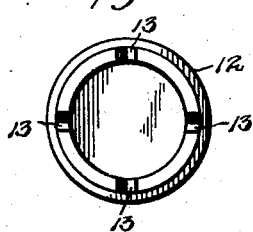
Figure 6:
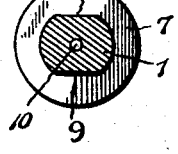
Figure 2:
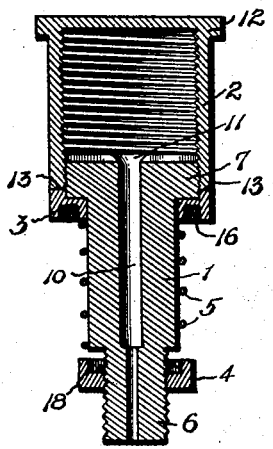
Figure 4:
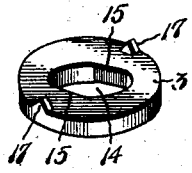
Figure 3:

In the drawings, Figure 1 is a side elevation of a lubricator embodying the features of the present invention. Fig. 2 is a longitudinal sectional view thereof. Fig. 3 is a detail perspective view of the stem of the device. Fig. 4 is a detail perspective view of the yieldable ratchet member. Fig. 5 is an inverted plan view of the cap. Fig. 6 is an inverted cross-sectional view of the stem.

Like characters of reference designate corresponding parts in each and every figure of the drawings.

The embodiment of the device of the present invention as shown in the accompanying drawings consists in general of a tubular stem or body 1, a cap, cup, or chamber 2, carried by and adjustable longitudinally upon the upper end of the stem and designed to contain the lubricant; a non-rotatable ratchet member 3, embracing the stem and yieldably held against the bottom of the cap; a nut 4, adjustable upon the lower end of the stem, and a helical spring 5, embracing the stem and bearing in opposite directions against the nut and the ratchet member to yieldably hold the latter in engagement with the cup.

In detail the stem has its lower end reduced and screw-threaded, as at 6, for convenience in attaching the device, while the opposite or upper end of the stem is enlarged to form a circular or disk-shaped head 7, having a screw-threaded periphery and provided in its top with a diametric groove 8 to form a screw-driver seat for convenience in fitting the stem in place. The intermediate portion of the stem is externally substantially cylindrical in shape, but slightly flattened at diametrically opposite points, as at 9, to make the stem polygonal, in effect, for a purpose that will hereinafter appear. Throughout the stem extends an axial bore 10, which is reduced in diameter through the reduced lower end portion of the stem, and the upper end of the bore is flared, as at 11, to facilitate the entrance of the lubricant into the bore of the stem.

It is designed to have the lubricant, which is preferably a grease rather than an oil, contained within the cap 2, which is internally screw-threaded and of a diameter to fit the head of the stem, whereby said head forms a bottom for the cup, and the latter is adjustable upon the head longitudinally of the stem. By this arrangement pressure may be applied upon the lubricant to insure an effective feed thereof through the bore of the stem. At the top of the cup there is an external annular flange 12, which is milled or otherwise roughened to afford a firm finger-grasp in turning the cup to adjust or shift the same upon the stem. In the bottom edge of the cup are a plurality of inverted substantially V-shaped notches, one of which has been shown at 13 in Fig. 1 of the drawings, there being, preferably, four such notches at quarter intervals around the cup.

Beneath the head 7 and slidable longitudinally upon the stem is the ratchet member 3, preferably in the form of a disk having an external diameter at least equal to that of the cup, against the lower edge of which it is normally and yieldably held by the spring 5. The stem-opening 14 of this disk has its wall flattened at diametrically opposite points, as at 15, to work against the flat faces of the stem, and thereby prevent rotation of the disk. In the bottom of the disk is an annular groove 16 to form a seat for the upper end of the spring, and a pair of diametrically opposite studs, projections, or teeth 17 rise from the top of the disk and are shaped to fit the notches 13 in the bottom of the cup, thereby to form a ratchet device to prevent accidental turning and consequent loosening of the cap upon the head otherwise incident to the jarring and vibrating movements to which lubricators of the present type are subjected.

From the foregoing description it will be understood that the cap 2 may be conveniently turned by hand to feed it downwardly for maintaining a pressure upon the lubricant, as the ratchet member 3 will yield under the downward movement of the cap; but the latter is held against accidental turning and loosening by the ratchet-teeth 17 fitting in corresponding notches 13 in the lower edge of the cap.

While the nut 4 forms a stationary annular shoulder for the support of the lower end of the spring, it is also adjustable longitudinally upon the stem to vary the tension upon the spring, and thereby adjust the latter to existing circumstances. In addition the upper side of the nut is provided with a central socket 18 or is dished to form a seat for the lower end of the spring and also to receive the lower end of the intermediate portion of the stem, and thereby somewhat increase the range of adjustment of the nut or shoulder.

Having thus described the invention, what is claimed, and desired to be secured by Letters Patent, is—

A lubricator embodying a tubular attaching-stem having one end externally screw-threaded and its opposite end provided with a circular external screw-threaded enlarged head, an internally-screw-threaded lubricant-containing cap adjustably embracing the head and provided with ratchet-notches in its lower edge, a non-rotatable ratchet member slidably embracing the intermediate portion of the stem and provided with upstanding ratchet-teeth for engagement with the notches of the cap, a helical spring embracing the stem and bearing at its upper end against the under side of the ratchet member to yieldably hold the latter in engagement with the cap, and means for varying the tension of the spring consisting of a nut adjustable upon and removable from the first-mentioned screw-threaded end of the stem and engaging the lower end of the spring, whereby the tension of the latter may be varied by an adjustment of the nut.

In testimony whereof I have signed my name to this specification in presence of two witnesses.

GEORGE W. BOWEN.

Witnesses:
D. E. FRENCH,
F. H. WIGGINS.